Patented July 18, 1939

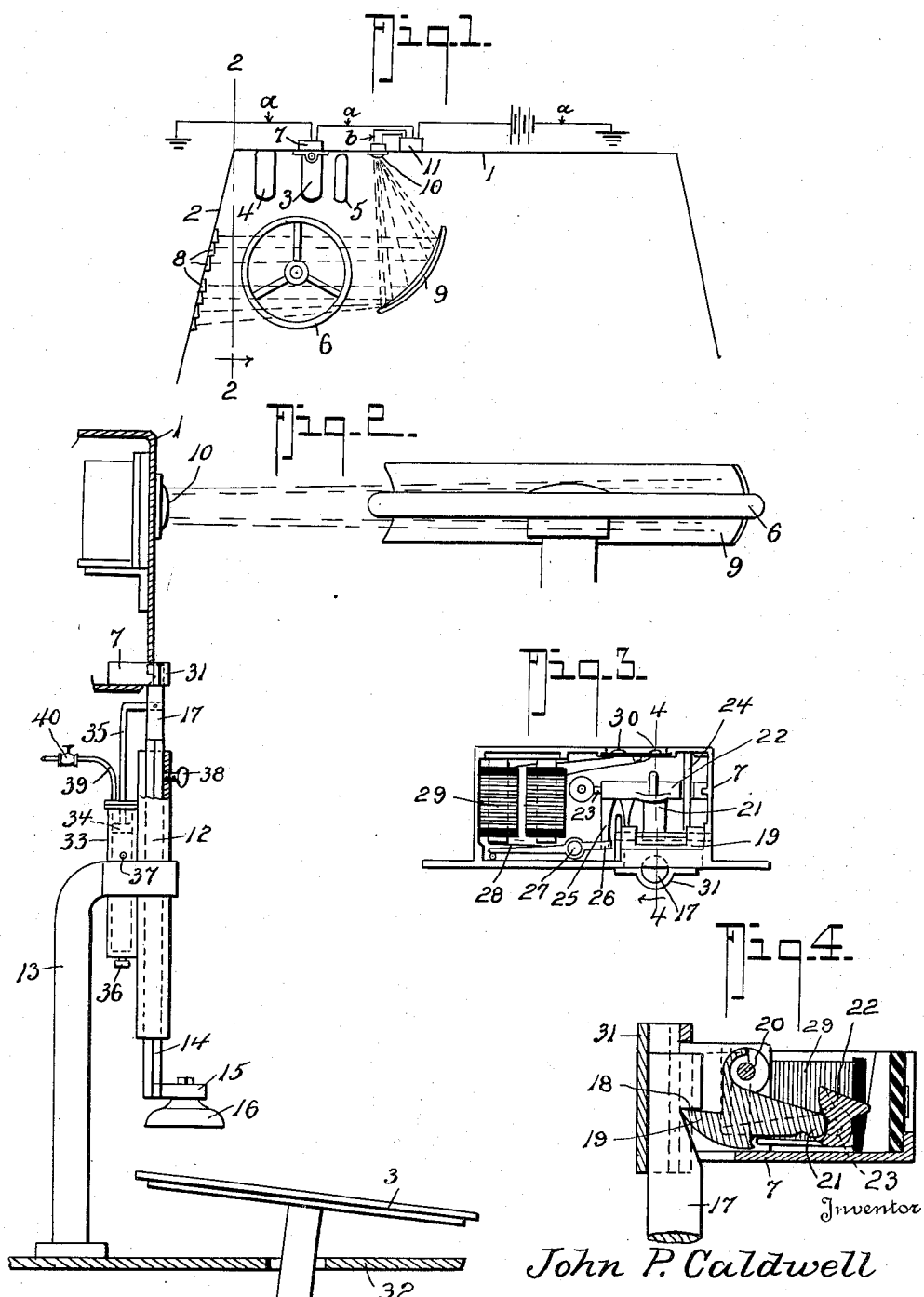

2,166,580

UNITED STATES PATENT OFFICE 2,166,580

MOTOR VEHICLE SAFETY DEVICE

John P. Caldwell, Portland, Maine

Application November 25, 1938, Serial No. 242,437

4 Claims. (Cl. 188—110)

My invention relates to certain new and useful mechanism for applying the brakes of motor vehicles, especially the air brakes of trucks, busses, etc. The air brakes usually require but little pressure on the brake pedal to effect the application of the brakes.

The invention has for its primary object to provide means to apply the brakes whenever the operator removes his hands from the steering wheel. In this way, should an operator faint or fall dead at the wheel, the brakes will be immediately applied and a wreck avoided. When a person dies at the wheel it is usually from heart-failure or a stroke; when death strikes in this way, the body becomes limp and the operator's hands drop from the wheel.

Further, the invention has for an object to control the brake application effecting device by the use of a photo-tube and a photo-electric relay.

Other objects of the invention will in part be obvious and in part will be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Fig. 1 is a diagrammatic plan view of the invention as applied to a bus.

Fig. 2 is a detail section and elevation of parts of a motor vehicle and of the invention.

Fig. 3 is a plan view of the electro-magnetically released latch device for holding the brake actuator inactive.

Fig. 4 is an enlarged detail cross section on the line 4—4 of Fig. 3.

Referring now to the accompanying drawing, which is illustrative of the principle of the invention, 1 is the instrument board or the dash board of the vehicle, 3 the usual brake pedal, 4 the clutch pedal, 5 the accelerator pedal, and 6 the usual steering wheel.

In applying the invention to the vehicle, I provide one or more light sources 8 whose rays are directed in planes parallel and adjacent that of the steering wheel 6 across, below and, preferably, also above the wheel onto a focusing mirror 9 which collects the rays of light and focuses them onto the photo-tube of the electric eye 10. This tube is electrically connected to a photo-electric relay 11 by suitable wiring b, the controlled circuit being indicated by a in Fig. 1.

An electro-magnet 29 of an electro-magnetically released latch device (Figs. 3 and 4) is connected in this circuit a so that when current flows in circuit a magnets 29 will be energized to release the latch 19, as will more fully appear later.

The photo-electric relay 11 is of the type that when a predetermined amount of light is shining into the electric eye 10 the circuit a will be energized, but when less than the predetermined amount of light falls on the eye 10 the circuit a will be opened.

The portion of the apparatus which is actuated by the photo-electric relay includes not only the latch device shown particularly in Figs. 3 and 4 but also a brake applicator which is best shown in Fig. 2 and comprises a vertical guide 12 suitably supported in a fixed position in any approved way, as for example by a support 13. In the guide 12 is a heavy bar 14 of metal, angular in cross section so as not to swivel in the guide. The bar 14 has a foot 15 carrying a rubber or other yieldable pad 16. At its upper end 17 the bar is formed with a notch 18 to receive the latch 19 (see Fig. 4) to hold the bar up, as in Fig. 2.

Attached to the bar is a piston rod 35 which works in a cylinder 33 forming a sort of air-spring dash pot to enable a service application of the brakes to be obtained, instead of an emergency application, if desired. In order that the speed of drop of bar 14 may be regulated for the above purposes, the cylinder is provided with an adjustable air leak or bleed valve 36 of any approved construction. The cylinder is preferably provided with a quick air escape port 37 at such place that the first part of the drop of bar 14, on being released, will not be checked. This allows for pad 16 to touch pedal 3 before the pedal is depressed by the weight of the bar. As soon as (or just before) pad 16 engages pedal 3, piston 34 closes hole 37 and compresses the air beneath, more or less, the air escaping through regulating valve 36, allowing the further fall of bar 14, at the desired speed, to press pedal 3 down to set the brakes.

When it is desired to render the bar 14 inoperative it may be held in either the elevated position (brakes off) or the lowered position (brakes on) by means of a clamp screw 38.

The latch device used may be such a one as is commonly used as the keeper in electric door unlatching systems and it comprises generally a case 7 in which is pivoted, at 20, the latch 19 whose heel 21 lies in the socket of a keeper 22, pivoted at 23, and having an arm 25 to lie under the armature lever 26. The lever 26 is pivoted at 27 and has a spring 28 which always tends to keep the armature over the arm 25 to hold the keeper 22 from movement. The usual leaf spring 24 is employed continuously to tend to move latch 19 to its holding position (Fig. 4). The magnetic coils 29 are wired to the terminals 30 on an insulation block held across an opening in the case 7.

A guide 31 is secured to the face of the latch device for the end 17 of bar 14 when the bar is raised so it cannot be jarred loose accidentally.

If desired, compressed air may be admitted to the cylinder 33 above piston 34 via pipe 39 and regulating valve 40 from an air storage tank (not shown), or other suitable source, to increase the acceleration of bar 14 during its fall toward the pedal.

*Operation*

When the operator is in normal driving position, his hands on the wheel intercept some of the rays of light traveling from light sources 8 to the photo-tube in the electric eye 10, thereby reducing the light which reaches the photo-tube and consequently the relay 11 causes the circuit a to de-energize magnets 29. The bar 17, which has been previously raised and latched up, will be held in the elevated position. Should the operator, however, remove both hands from wheel 6 so that the full flow of light rays may pass via focusing reflector 9 to eye 10, current will be caused to flow through circuit a, thereby energizing magnet 29 to rock armature lever 26, release keeper 22 and instantly permit weighted bar 14 to rock latch 19 counter-clockwise (down), in Fig. 4, to free bar 14, which drops down with pad 16 onto pedal 3, the weight of the bar then causing pedal 3 to be depressed and thereby effect a setting of the brakes through the usual pedal actuated or controlled system (not shown) of the vehicle.

The brakes may be voluntarily "locked" set by tightening the thumb screw 38 with plunger bar 14 down, or the bar may be "locked" out of action (up) in the same manner.

While I have shown and described one embodiment of the invention, it will be obvious that other changes in the position of the light source 8 and eye 10, etc., may have to be made to adapt the arrangement to particular types of vehicles, but such modification—and others which will be clear to those skilled in the art—may be made without departing from the spirit of the invention and the appended claims.

What I claim is:

1. In motor vehicles having brake systems in which the brakes are applied by movement of a brake pedal, and having a steering wheel, the combination with the brake pedal of means to apply braking pressure to the pedal, electrically releasable means to hold said applying means inoperative, and means including a photo-electric relay and photo-tube, and an electric circuit including said relay and said electrically releasable means, and light ray projecting means in cooperative relation to the steering wheel and to said photo-tube and constructed so that only when the steering wheel is clear will it effect a release of said electrically releasable means to effect the operation of said brake pressure applying means.

2. In motor vehicles having brake systems in which the brakes are applied by movement of a brake pedal, and having a steering wheel, the combination with the steering wheel and the brake pedal, of means governed by the absence and presence of the operator's hand on the steering wheel to press the brake pedal and set the brakes when the hands are removed from the steering wheel, said means comprising a vertically slidable bar located over the brake pedal, a latch device to hold the bar elevated, electro-magnetic means which when energized will release said latch, a photo-electric relay, having a photo-tube, in circuit with said electro-magnetic means to effect energization of the same under predetermined light influence on the photo-tube of said relay, and means to direct light rays over and adjacent said steering wheel onto said photo-tube, the arrangement being such that when the rays are interrupted by hands on the steering wheel the electro-magnetic means will be inoperative.

3. In motor vehicles having brake systems in which the brakes are applied by movement of a brake pedal, and having a steering wheel, the combination with the steering wheel and the brake pedal, of means governed by the absence and presence of the operator's hand on the steering wheel to press the brake pedal and set the brakes when the hands are removed from the steering wheel, said means comprising a vertically slidable bar located over the brake pedal, a latch device to hold the bar elevated, electro-magnetic means which when energized will release said latch, a photo-electric relay, having a photo-tube, in circuit with said electro-magnetic means to effect energization of the same under predetermined light influence on the photo-tube of said relay, means to direct light rays over and adjacent said steering wheel onto said photo-tube, the arrangement being such that when the rays are interrupted by hands on the steering wheel the electro-magnetic means will be inoperative, and means to effect a rapid drop of said bar when first released until it engages the brake pedal and then cushion the drop to give a service application of the brakes.

4. In motor vehicles having brake systems in which the brakes are applied by movement of a brake pedal, and having a steering wheel, the combination with the steering wheel and the brake pedal, of means governed by the absence and presence of the operator's hand on the steering wheel to press the brake pedal and set the brakes when the hands are removed from the steering wheel, said means comprising a vertically slidable bar located over the brake pedal, a latch device to hold the bar elevated, electro-magnetic means which when energized will release said latch, a photo-electric relay, having a photo-tube, in circuit with said electro-magnetic means to effect energization of the same under predetermined light influence on the photo-tube of said relay, means to direct light rays over and adjacent said steering wheel onto said photo-tube, the arrangement being such that when the rays are interrupted by hands on the steering wheel the electro-magnetic means will be inoperative, means to effect a rapid drop of said bar when first released until it engages the brake pedal and then cushion the drop to give a service application of the brakes, and means to adjust the cushioning action to obtain greater or lesser speeds of fall of the bar during brake application.

JOHN P. CALDWELL.